United States Patent
Song

(10) Patent No.: US 12,318,987 B2
(45) Date of Patent: Jun. 3, 2025

(54) METHOD FOR CONSOLIDATING A BULK MOLDING COMPOUND

(71) Applicant: The Boeing Company, Chicago, IL (US)

(72) Inventor: Weidong Song, Mukilteo, WA (US)

(73) Assignee: The Boeing Company, Chicago, IL (US)

(\*) Notice: Subject to any disclaimer, the term of this patent is extended or adjusted under 35 U.S.C. 154(b) by 476 days.

(21) Appl. No.: 17/662,156

(22) Filed: May 5, 2022

(65) Prior Publication Data
US 2022/0258402 A1    Aug. 18, 2022

Related U.S. Application Data

(62) Division of application No. 15/982,931, filed on May 17, 2018, now abandoned.

(51) Int. Cl.
| | | |
|---|---|---|
| *B29C 48/76* | (2019.01) | |
| *B29C 48/00* | (2019.01) | |
| *B29C 48/285* | (2019.01) | |
| *B29C 48/30* | (2019.01) | |
| *B29C 48/345* | (2019.01) | |
| *B29C 48/475* | (2019.01) | |
| *B29C 48/693* | (2019.01) | |
| *B29C 48/695* | (2019.01) | |
| *B29K 105/14* | (2006.01) | |

(52) U.S. Cl.
CPC .......... *B29C 48/693* (2019.02); *B29C 48/022* (2019.02); *B29C 48/2886* (2019.02); *B29C 48/30* (2019.02); *B29C 48/345* (2019.02); *B29C 48/475* (2019.02); *B29C 48/695* (2019.02); *B29C 48/767* (2019.02); *B29K 2105/14* (2013.01)

(58) Field of Classification Search
CPC ... B29C 48/022; B29C 48/06; B29C 48/2886; B29C 48/30; B29C 48/362; B29C 48/365; B29C 48/388; B29C 48/475; B29C 48/48; B29C 48/693; B29C 48/695; B29C 48/70; B29C 48/705; B29C 48/767; B29B 7/84; B29K 2105/14
See application file for complete search history.

(56) References Cited

U.S. PATENT DOCUMENTS

| | | |
|---|---|---|
| 3,530,916 A | 9/1970 | Williams |
| 3,936,519 A | 2/1976 | Crystal |
| 4,565,512 A | 1/1986 | Wills et al. |

(Continued)

FOREIGN PATENT DOCUMENTS

| | | |
|---|---|---|
| CH | 263350 A | 7/1949 |
| CN | 100544806 C | 9/2009 |

(Continued)

OTHER PUBLICATIONS

English Translation of JP63-134219 (Year: 1988).*
(Continued)

*Primary Examiner* — Xiao S Zhao
*Assistant Examiner* — Joseph S Leyson
(74) *Attorney, Agent, or Firm* — Yee & Associates, P.C.

(57) ABSTRACT

Methods and an apparatus are presented. A bulk molding compound is consolidated by sending the bulk molding compound through a die breaker and an extrusion die of a consolidation system.

24 Claims, 9 Drawing Sheets

(56) References Cited

U.S. PATENT DOCUMENTS

| | | | |
|---|---|---|---|
| 5,165,941 A | 11/1992 | Hawley | |
| 5,189,092 A | 2/1993 | Koslow | |
| 5,486,104 A | 1/1996 | Cowley | |
| 8,302,823 B2 | 11/2012 | Lim | |
| 8,979,522 B2 * | 3/2015 | Wolff | B02C 18/365 |
| | | | 425/377 |
| 2002/0130434 A1 | 9/2002 | Rigali et al. | |
| 2015/0183142 A1 | 7/2015 | Baldwin et al. | |
| 2017/0028606 A1 | 2/2017 | Song et al. | |
| 2017/0197350 A1 | 7/2017 | Song | |
| 2017/0258684 A1 * | 9/2017 | Gueller | B29B 7/38 |
| 2019/0351599 A1 | 11/2019 | Song | |

FOREIGN PATENT DOCUMENTS

| | | |
|---|---|---|
| DE | 4004587 A1 | 8/1991 |
| EP | 2565004 A1 | 3/2013 |
| GB | 1471217 A | 4/1977 |
| JP | 5619319 U | 2/1981 |
| JP | S63134219 A | 6/1988 |
| JP | 08001664 A | 1/1996 |
| JP | H081664 A | 1/1996 |
| JP | 2015101097 A | 6/2015 |

OTHER PUBLICATIONS

Mbaocha et al.; "Design of a Plastic Extrusion System Controller"; International Journal of Scientific & Engineering Research; vol. 7, Issue 7; Jul. 2016; pp. 595-598.

Yi "Continuous Ram Extrusion of Polymers" PhD Thesis University of London. (Year: 1975).

European Patent Office Partial Search Report, dated Aug. 21, 2019, regarding Application No. 19162057.4, 14 pages.

European Patent Office Extended Search Report, dated Nov. 22, 2019, regarding Application No. 19162057.4, 12 pages.

European Patent Office Communication Report, dated Dec. 21, 2021, regarding EP Application No. 19162057.4, 5 pages.

Office Action dated Sep. 1, 2020, regarding U.S. Appl. No. 15/982,931; 19 pages.

Final Office Action dated Apr. 28, 2021, regarding U.S. Appl. No. 15/982,931; 10 pages.

Office Action dated Sep. 30, 2021, regarding U.S. Appl. No. 15/982,931; 11 pages.

Final Office Action dated Mar. 16, 2022, regarding U.S. Appl. No. 15/982,931; 12 pages.

Japan Patent Office, Notice of Reasons for Rejection with English Translation, dated Jan. 30, 2023, regarding Application No. JP2019-047034, 6 pages.

* cited by examiner

METHOD FOR CONSOLIDATING A BULK MOLDING COMPOUND

CROSS-REFERENCE TO RELATED APPLICATION

This application is a Divisional of U.S. patent application Ser. No. 15/982,931, filed May 17, 2018, and entitled "Method and Apparatus for Consolidating a Bulk Molding Compound," which is incorporated herein by reference in its entirety.

BACKGROUND INFORMATION

1. Field

The present disclosure relates generally to manufacturing composite structures and, more specifically, to composite materials used in molding processes. Yet more specifically, the present disclosure presents methods and an apparatus for consolidating a bulk molding compound.

2. Background

Bulk molding compound is used to form composite structures in molding processes. Bulk molding compound is a compound formed from chopped fibers and at least one resin material. The chopped fibers contribute strength to composite structures formed by the bulk molding compound. Composite structures formed from bulk molding compound may not be as strong as desired.

Therefore, it would be desirable to have a method and apparatus that take into account at least some of the issues discussed above, as well as other possible issues. For example, it would be desirable to form composite structures having a lower porosity through molding processes. As another example, it would be desirable to form composite structures with fewer inconsistencies through molding processes.

SUMMARY

An illustrative embodiment of the present disclosure provides a method. A bulk molding compound is consolidated by sending the bulk molding compound through a die breaker and an extrusion die of a consolidation system.

Another illustrative embodiment of the present disclosure provides a method. A bulk molding compound is heated to form a heated bulk molding compound. The heated bulk molding compound is loaded into a consolidation system. The heated bulk molding compound is pressed to form a pressed material. The pressed material is extruded through an extrusion die of the consolidation system.

A further illustrative embodiment of the present disclosure provides a method. A bulk molding compound is heated to form a heated bulk molding compound. The heated bulk molding compound is degassed in a consolidation system. The heated bulk molding compound is consolidated after degassing, in which consolidating comprises pressing the heated bulk molding compound through a die breaker form a pressed material. The pressed material is relaxed. The pressed material is extruded through an extrusion die of the consolidation system after relaxing the pressed material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
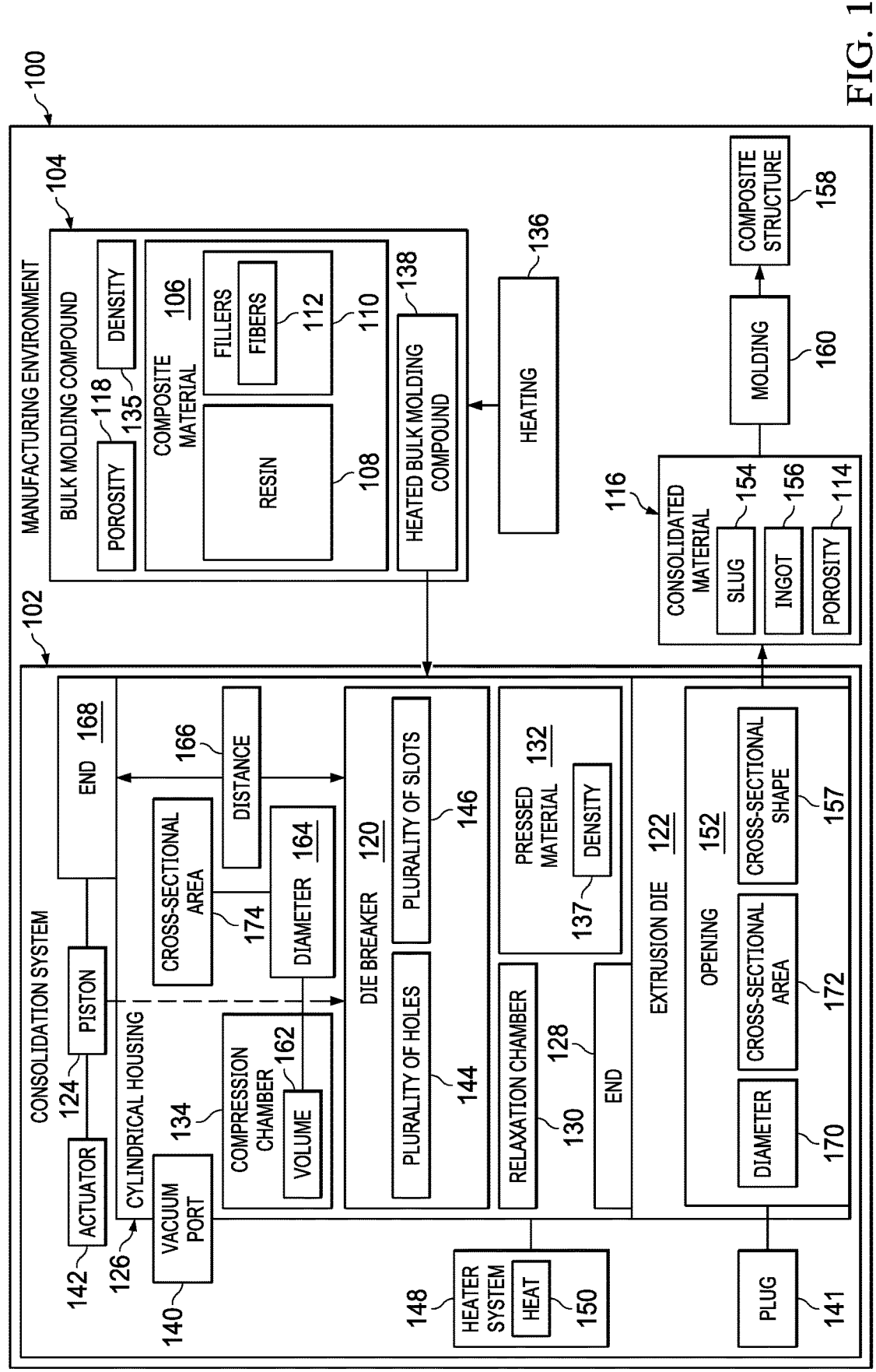
FIG. 1 is an illustration of a block diagram of a manufacturing environment in which a bulk molding compound is consolidated in accordance with an illustrative embodiment.

The illustrative embodiments recognize and take into account one or more different considerations. For example, the illustrative embodiments recognize and take into account that bulk molding compound (BMC), or bulk molding composite, is used in several industries and several different platforms such as, for example, a mobile platform, a stationary platform, a land-based structure, an aquatic-based structure, or a space-based structure. More specifically, a platform may be a surface ship, a tank, a personnel carrier, a train, a spacecraft, a space station, a satellite, a submarine, an automobile, a power plant, a bridge, a dam, a house, a manufacturing facility, a building, an appliance, or some other suitable platform. The illustrative embodiments recognize and take into account that bulk molding compound may be used in electrical applications, corrosion resistant applications, or other applications with specific technical or performance standards.

The illustrative embodiments recognize and take into account that bulk molding compound is commercially available and may include any desirable type or mixture of types of chopped fibers. The illustrative embodiments recognize and take into account that the chopped fibers may include glass, carbon, Kevlar, or any other desirable type of fibers. The illustrative embodiments recognize and take into account that the bulk molding compound may include either a thermoset or a thermoplastic resin system. The illustrative embodiments recognize and take into account that the bulk molding compound may include any desirable type of polymer resin system, such as an epoxy, a phenolic, a polyester resin, a vinyl ester, Polyetheretherketone (PEEK)/Polyetherketoneketone (PEKK), Polyphenylsulfone (PPSU), a polyamide, or any other desirable type of resin system.

The illustrative embodiments recognize and take into account that bulk molding compound is commercially available and provided in a state that is ready for molding. The illustrative embodiments recognize and take into account that bulk molding compound may be provided in bulk or logs.

The illustrative embodiments recognize and take into account that bulk molding compound is manufactured by mixing strands of chopped fibers in a mixer with a resin. The illustrative embodiments recognize and take into account that the chopped fibers in bulk molding compound contribute to the strength properties of the composite structures formed by the bulk molding compound. The illustrative embodiments recognize and take into account that in some instances, the chopped fibers in the bulk modeling compound may create greater strength than the neat resin system, e.g., epoxy without fiber reinforcement.

The illustrative embodiments recognize and take into account that at high fiber volume fraction, it may be more challenging than desired to fully wet all of the chopped fibers in the bulk molding compound. The illustrative embodiments recognize and take into account that it may be more challenging than desired to make a fully consolidated bulk molding compound for final application.

The illustrative embodiments recognize and take into account that a not fully consolidated bulk molding compound may create inconsistencies in the cured composite material. The illustrative embodiments recognize and take into account that a not fully consolidated bulk molding compound may produce less than desirable quality in the cured material. The illustrative embodiments recognize and take into account that a not fully consolidated bulk molding compound may produce higher than desirable porosity levels in the cured material.

The illustrative examples recognize and take into account that composite materials may be used to form composite radius fillers or composite "noodles." The illustrative examples recognize and take into account that composite radius fillers desirably have axially aligned fibers to provide tension strength.

Referring now to the figures and, in particular, with reference to FIG. 1, an illustration of a block diagram of a manufacturing environment in which a bulk molding compound is consolidated is depicted in accordance with an illustrative embodiment. Manufacturing environment 100 has consolidation system 102 configured to consolidate bulk molding compound 104. Bulk molding compound 104 is loose composite material 106 formed of resin 108 and fillers 110. In some illustrative examples, fillers 110 take the form of fibers 112. Fibers 112 may be formed of any desirable material and have any desirable size. In some illustrative examples, fibers 112 have lengths in the range of 0.125" to 1.0". By consolidating bulk molding compound 104, porosity 114 in consolidated material 116 is lower than porosity 118 in bulk molding compound 104.

Consolidation system 102 comprises die breaker 120 and extrusion die 122. In some illustrative examples, bulk molding compound 104 is consolidated by sending bulk molding compound 104 through die breaker 120 and extrusion die 122.

Consolidation system 102 further comprises piston 124 and cylindrical housing 126. Die breaker 120 is contained within cylindrical housing 126. Extrusion die 122 is connected to end 128 of cylindrical housing 126. In some illustrative examples, consolidation system 102 is referred to as a "ram extruder."

Relaxation chamber 130 is formed by die breaker 120, cylindrical housing 126, and extrusion die 122. Bulk molding compound 104 is pressed through die breaker 120 to become pressed material 132 within relaxation chamber 130. Relaxation chamber 130 is used to stabilize material form.

Relaxation gives the pressed material 132 time to remix and expand prior to extrusion through extrusion die 122. Relaxation reduces expansion after extrusion through extrusion die 122. In some illustrative examples, relaxation reduces the porosity of consolidated material 116.

In some illustrative examples, relaxation chamber 130 may also be referred to as an "extrusion zone." In relaxation chamber 130, pressed material 132 is remixed after die breaker 120 and relaxes before being extruded through extrusion die 122. Remixing pressed material 132 aids in equal wetting of fillers 110 with resin 108. By relaxing, pressed material 132 does not retain the shape of plurality of holes 144 or plurality of slots 146 of die breaker 120.

When present, die breaker 120 provides for back pressure enhancement for extrusion die 122. When die breaker 120 is present, consolidated material 116 expands less after extrusion than when die breaker 120 is not present. When die breaker 120 is present, die breaker 120 increases homogenization of consolidated material 116.

Die breaker 120 has any desirable size and shape. For example, die breaker 120 has thickness 121. Thickness 121 is selected to provide consolidation to bulk molding compound 104. Thickness 121 is selected so that bulk molding compound 104 spends sufficient time moving through die breaker 120 such that bulk molding compound 104 is consolidated. In some illustrative examples, thickness 121 is in the range of 0.25 inches to 1.0 inch. In some illustrative examples, thickness 121 is approximately 0.5 inches.

Prior to being pressed through die breaker 120, bulk molding compound 104 is loaded into compression chamber 134. Compression chamber 134 is formed by die breaker 120, piston 124, and cylindrical housing 126.

In some illustrative examples, compression chamber 134 may be referred to as a "material feed chamber." Bulk molding compound 104 in compression chamber 134 has a lower density than pressed material 132 in relaxation chamber 130. More specifically, density 135 of bulk molding compound 104 is lower than density 137 of pressed material 132.

By piston 124 moving towards extrusion die 122, bulk molding compound 104 is mixed and consolidated. Movement of bulk molding compound 104 within compression chamber 134 mixes resin 108 and fillers 110. Bulk molding compound 104 is consolidated through at least one of applied force, heating, or degassing.

In some illustrative examples, prior to loading bulk molding compound 104 into consolidation system 102, heating 136 is applied to bulk molding compound 104 to form heated bulk molding compound 138. In these illustrative examples, heated bulk molding compound 138 is loaded into consolidation system 102.

In these illustrative examples, bulk molding compound 104 is heated to above the glass transition temperature Tg of resin 108 so that bulk molding compound 104 is significantly softened. The temperature should also be well below the cure temperature of resin 108 so that no chemical reaction is trigged due to this operation. In some illustrative examples, heating 136 is performed until resin 108 is flowable.

After loading heated bulk molding compound 138 into consolidation system 102, heated bulk molding compound 138 is degassed. To degas heated bulk molding compound 138, a vacuum is applied to heated bulk molding compound 138. The vacuum is applied through vacuum port 140 within cylindrical housing 126. The vacuum applied through vacuum port 140 degases heated bulk molding compound 138 initially within compression chamber 134. The vacuum also evacuates gases from compression chamber 134 and relaxation chamber 130.

Degassing heated bulk molding compound 138 removes gases from heated bulk molding compound 138. Removing gases from heated bulk molding compound 138 increases density 135 of bulk molding compound 104 within cylindrical housing 126.

In order to degas heated bulk molding compound 138, cylindrical housing 126 is sealed. Cylindrical housing 126 is sealed by associating an airtight component, such as plug 141, with end 128 of cylindrical housing 126 and another airtight component, such as piston 124, with end 168 of cylindrical housing 126.

In some illustrative examples, piston 124 seals cylindrical housing 126 to enable a vacuum to be applied to pull gas out of heated bulk molding compound 138. In these illustrative examples, piston 124 forms an airtight seal with cylindrical housing 126. In some other illustrative examples, piston 124 does not form an airtight seal with cylindrical housing 126. In these illustrative examples, a separate sealing component (not depicted) is associated with end 168 to seal cylindrical housing 126.

In some illustrative examples, a vacuum is applied through vacuum port 140 prior to pressing heated bulk molding compound 138 and the vacuum is no longer applied through vacuum port 140 after piston 124 extends past vacuum port 140. In these illustrative examples, piston 124 forms an airtight seal with cylindrical housing 126.

In some illustrative examples, a vacuum is applied throughout pressing heated bulk molding compound 138 through die breaker 120 of consolidation system 102. In these illustrative examples, a separate sealing component (not depicted) seals cylindrical housing 126 at end 168.

Plug 141 is associated with end 128 of cylindrical housing 126. Plug 141 seals end 128 of cylindrical housing 126 for application of vacuum through vacuum port 140. Plug 141 seals cylindrical housing 126 by blocking opening 152 of extrusion die 122. Plug 141 maintains the vacuum within cylindrical housing 126.

Plug 141 remains in place until pressed material 132 forces plug 141 out of opening 152. When pressed material 132 forces plug 141 out of opening 152, pressed material 132 passing through opening 152 maintains the vacuum within cylindrical housing 126.

After applying vacuum through vacuum port 140, actuator 142 moves piston 124 to press heated bulk molding compound 138 within cylindrical housing 126 of consolidation system 102. Pressing heated bulk molding compound 138 through die breaker 120 of consolidation system 102 comprises driving piston 124 towards extrusion die 122.

As depicted, pressing heated bulk molding compound 138 of consolidation system 102 to form pressed material 132 comprises pressing heated bulk molding compound 138 through die breaker 120 of consolidation system 102. Die breaker 120 includes at least one of plurality of holes 144 or plurality of slots 146.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

As depicted, consolidation system 102 includes heater system 148 associated with cylindrical housing 126. Heater system 148 includes any desirable quantity of heaters and any desirable type of heaters. Heater system 148 may be one of a convection heating system or a conduction heating system. By being associated with cylindrical housing 126, heater system 148 is configured to heat cylindrical housing 126. In some illustrative examples, heater system 148 is associated with cylindrical housing 126 by being directed at cylindrical housing 126. For example, heater system 148 may be a heated air source directed to blow the heated air across cylindrical housing.

In some illustrative examples, heater system 148 is associated with cylindrical housing 126 by contacting cylindrical housing 126. For example, a heating blanket may be wrapped around cylindrical housing 126 to heat cylindrical housing 126 to form heater system 148. In some illustrative examples, heater system 148 is associated with cylindrical housing 126 by being built into cylindrical housing 126. For example, resistive heating elements may be built into cylindrical housing 126 to form heater system 148.

Heater system 148 applies heat 150 to cylindrical housing 126 to reduce viscosity of bulk molding compound 104 within cylindrical housing 126. By reducing the viscosity of bulk molding compound 104 within cylindrical housing 126, the force provided by actuator 142 to press bulk molding compound 104 through die breaker 120 is reduced. Reducing the viscosity of bulk molding compound 104 in cylindrical housing 126 creates better processability. Reducing viscosity also leads to better degassing of bulk molding compound 104.

In some illustrative examples, extrusion die 122 may also be referred to as a forming die. Extrusion die 122 has opening 152 through which consolidated material 116 exits consolidation system 102. Extrusion die 122 forms consolidated material 116 into one of slug 154 or ingot 156.

Ingot 156 has any desirable profile, such as round, square, rectangular, triangular, or any other desirable profile. Opening 152 is shaped to create the desired profile of slug 154 or ingot 156. Opening 152 has any desirable size or shape based on a desired shape for slug 154 or ingot 156. Opening 152 has cross-sectional shape 157. Cross-sectional shape 157 is any desirable shape, such as round, square, rectangular, triangular, or any other desirable shape. In some illustrative examples, extrusion die 122 has opening 152 with cross-sectional shape 157 configured to form a composite radius filler.

In one illustrative example, extrusion die 122 is a slotted rectangular die. In this illustrative example, opening 152 of extrusion die 122 is used to extrude the material into thin sheets for forming into a bracket or thin shelled panel structures. In one illustrative example, extrusion die 122 has opening 152 with a triangular shape. In this illustrative example, extrusion die 122 with opening 152 having a triangular shape may be used to extrude bulk molding compound 104 for a radius filler application.

Consolidated material 116 is a material to be used for forming a composite structure, such as composite structure 158. Consolidated material 116 exiting extrusion die 122 is ready for a molding process, such as molding 160. As depicted, after exiting consolidation system 102, consolidated material 116 goes through molding 160 to form composite structure 158. In some illustrative examples, consolidated material 116 may be stored for a desired period of time prior to molding 160.

Composite structure 158 may have at least one of a lower porosity, fewer inconsistencies, or higher strength than a composite structure formed from bulk molding compound 104. Consolidating bulk molding compound 104 to create consolidated material 116 prior to forming composite structure 158 increases the quality of composite structure 158. In some illustrative examples, composite structure 158 is a part for an aircraft.

Consolidating bulk molding compound 104 using consolidation system 102 is a batch process. Consolidation system 102 may have any desirable dimensions. Volume 162 of compression chamber 134 affects the amount of bulk molding compound 104 that may be processed in a batch.

Diameter 164 of cylindrical housing 126 affects the amount of force supplied by actuator 142. Increasing diameter 164 increases the amount of force supplied by actuator 142 to consolidate bulk molding compound 104.

Diameter 164 of cylindrical housing 126 also affects volume 162 of compression chamber 134. Increasing diameter 164 of cylindrical housing 126 increases volume 162 of compression chamber 134. Volume 162 of compression chamber 134 is also affected by distance 166 between die breaker 120 and end 168 of cylindrical housing 126. For example, increasing distance 166 between die breaker 120 and end 168 increases volume 162. End 128 and end 168 of cylindrical housing 126 are opposite ends of cylindrical housing 126.

Extrusion die 122 has any desirable dimensions. In some illustrative examples, cross-sectional area 172 of opening 152 is at least 25% less than cross-sectional area 174 of cylindrical housing 126. In some illustrative examples, when opening 152 is circular, diameter 170 of opening 152 of extrusion die 122 is at least 25% less than diameter 164 of cylindrical housing 126.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, either bulk molding compound 104 or heated bulk molding compound 138 may be loaded into consolidation system 102 and consolidated using consolidation system 102. As another example, although die breaker 120 is present, in some illustrative examples, die breaker 120 may not be present in consolidation system 102.

As another example, although extrusion die 122 is shown as having only opening 152, extrusion die may have any desirable quantity of openings. In some illustrative examples, extrusion die 122 has more than one opening.

In some illustrative examples, consolidation system 102 is moved within manufacturing environment 100 by an automated movement system, such as a robotic arm. In these illustrative examples, consolidation system 102 may be a part of an end effector. In some illustrative examples, tooling is moved relative to consolidation system 102 to receive consolidated material 116.

As a further example, although molding 160 is shown, molding 160 may be optional. In some illustrative examples, consolidated material 116 forms composite structure 158 without molding 160. For example, cross-sectional shape 157 of opening 152 may form consolidated material 116 into slug 154 having a desired cross-sectional shape for a composite radius filler.

In some these illustrative examples, consolidation system 102 may be part of a composite radius filler end effector. In one illustrative example, consolidation system 102 is an end effector (not depicted) configured to extrude a composite radius filler to form composite structure 158. In some illustrative examples, consolidation system 102 extrudes consolidated material 116 directly onto another composite material to form a composite radius filler. In some illustrative examples, consolidation system 102 extrudes consolidated material 116 onto a tool to form a composite radius filler.

Figure 2:
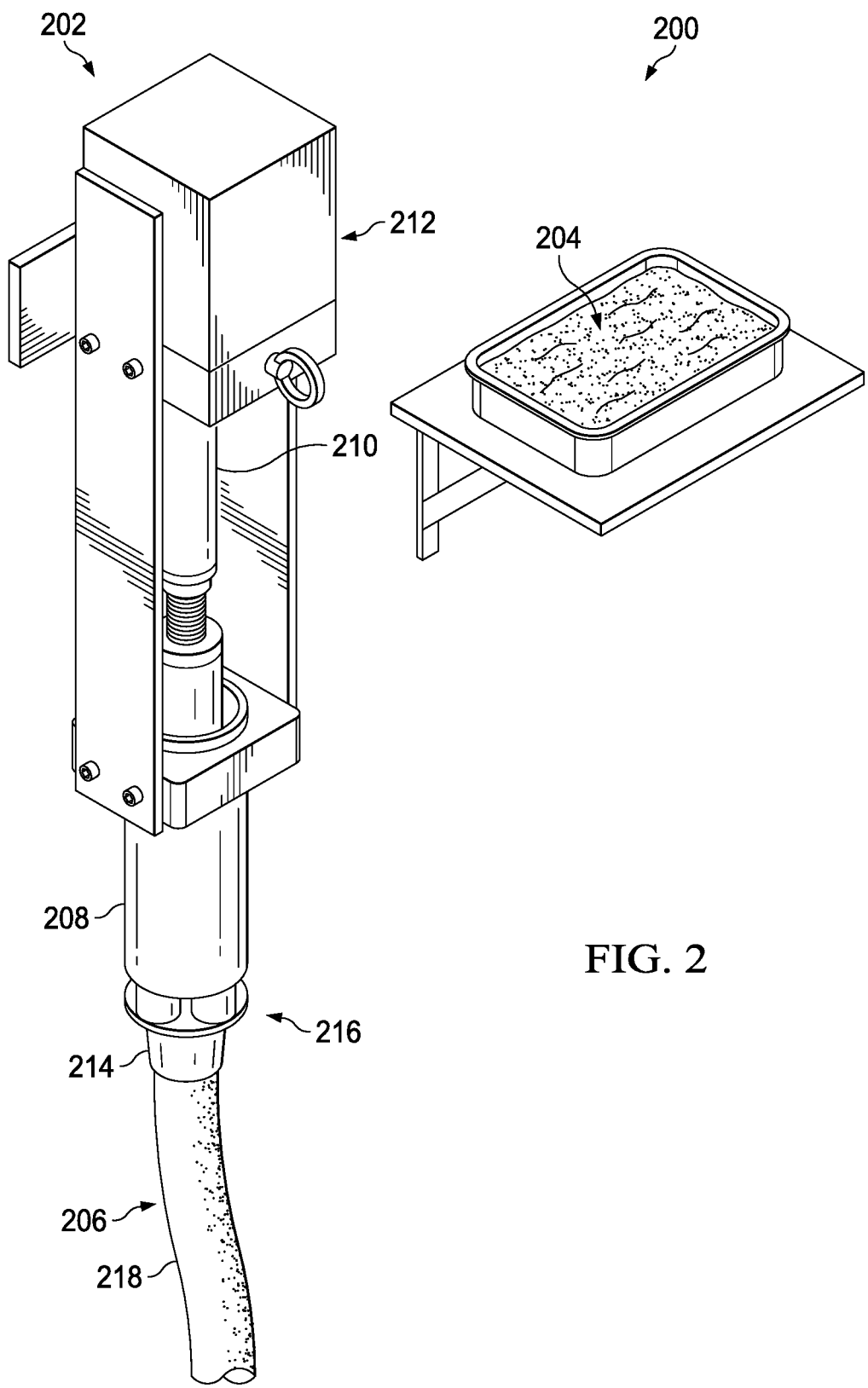
FIG. 2 is an illustration of a manufacturing environment in which a bulk molding compound is consolidated in accordance with an illustrative embodiment.

Turning now to FIG. 2, an illustration of a manufacturing environment in which a bulk molding compound is consolidated is depicted in accordance with an illustrative embodiment. Manufacturing environment 200 is a physical implementation of manufacturing environment 100 of FIG. 1. Manufacturing environment 200 includes consolidation system 202 and bulk molding compound 204. Bulk molding compound 204 is a physical implementation of bulk molding compound 104 of FIG. 1.

As depicted, consolidated material 206 is extruded from consolidation system 202. Consolidated material 206 has a porosity (not depicted) that is less than a porosity (not depicted) of bulk molding compound 204.

To form consolidated material 206, bulk molding compound 204 is loaded into consolidation system 202. In some illustrative examples, bulk molding compound 204 is heated prior to loading bulk molding compound 204 into cylindrical housing 208.

After loading bulk molding compound 204 into cylindrical housing 208, piston 210 is associated with cylindrical housing 208 to seal cylindrical housing 208. After sealing cylindrical housing 208 using piston 210, bulk molding compound 204 within cylindrical housing 208 is degassed. To degas the material within cylindrical housing 208, a vacuum is applied within cylindrical housing 208. The vacuum is applied through a vacuum port (not depicted) in the cylindrical housing 208. The vacuum is applied to the vacuum port (not depicted) in the cylindrical housing 208 by a vacuum source.

To form consolidated material 206, actuator 212 drives piston 210 towards extruder die 214. Extruder die 214 is connected to end 216 of cylindrical housing 208. By driving piston 210 towards extruder die 214, material, such as bulk molding compound 204, is pressed within cylindrical housing 208 and extruded through extruder die 214. As depicted, consolidated material 206 exits extruder die 214 as slug 218.

In some illustrative examples, slug 218 is subjected to an additional molding process to form a composite structure. In some other illustrative examples, slug 218 is used with the extruded cross-section. For example, slug 218 may be laid down as a composite radius filler in some illustrative examples.

In some illustrative examples, consolidation system 202 is part of an end effector to apply slug 218 to a composite material or tooling. In some illustrative examples, consolidation system 202 is part of a composite radius filler extruding end effector in which slug 218 is used as a composite radius filler.

Figure 3:
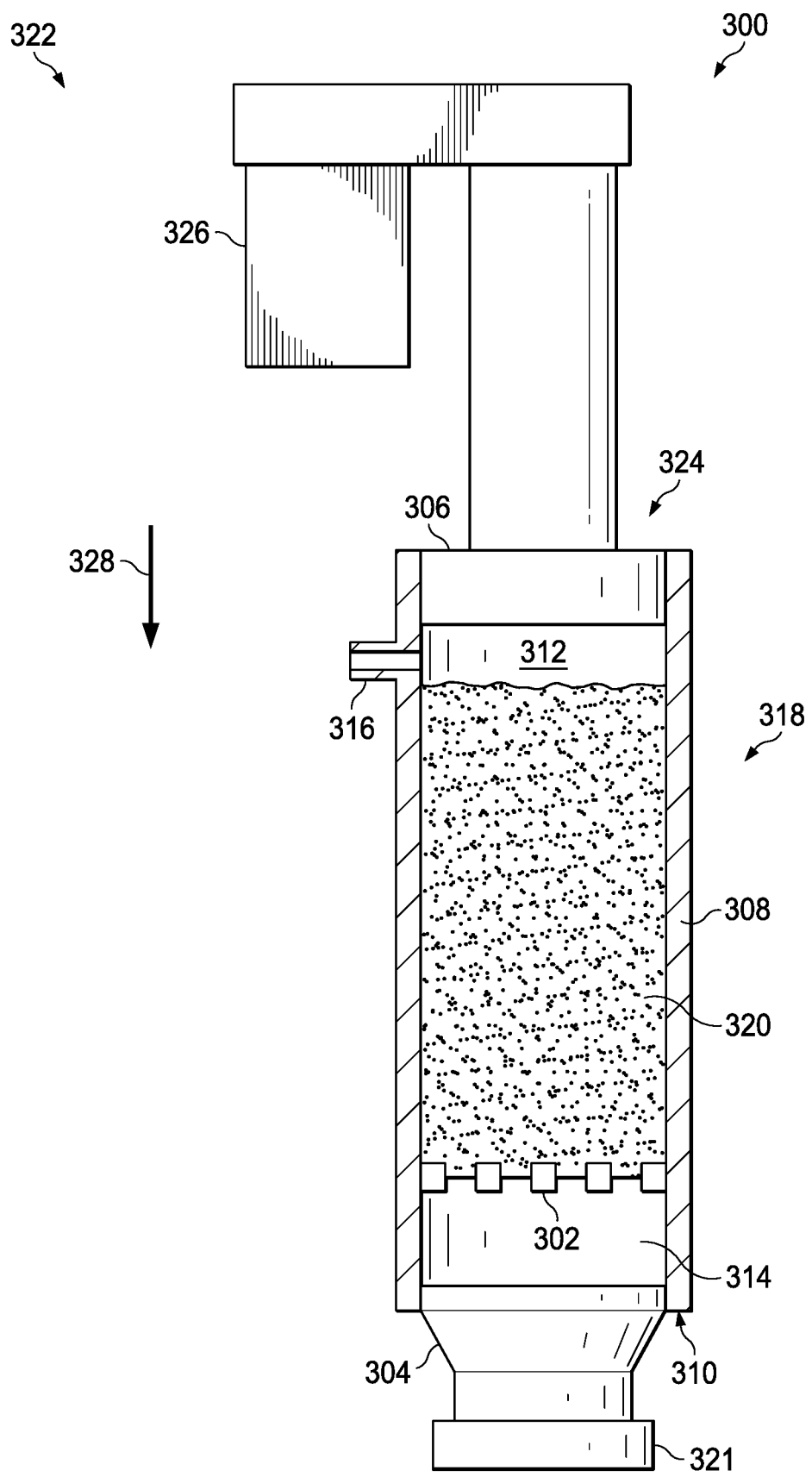
FIG. 3 is an illustration of a cross-sectional view of a consolidation system in which a bulk molding compound is consolidated in accordance with an illustrative embodiment.

Turning now to FIG. 3, an illustration of a cross-sectional view of a consolidation system in which a bulk molding compound is consolidated is depicted in accordance with an illustrative embodiment. Consolidation system 300 is a physical implementation of consolidation system 102 of FIG. 1. As depicted, consolidation system 300 has die breaker 302 and extrusion die 304. Consolidation system 300 also has piston 306 and cylindrical housing 308. Die breaker 302 is contained within cylindrical housing 308. Extrusion die 304 is connected to end 310 of cylindrical housing 308.

Compression chamber 312 is formed by die breaker 302, piston 306, and cylindrical housing 308. Relaxation chamber 314 is formed by die breaker 302, cylindrical housing 308, and extrusion die 304.

Vacuum port 316 is within cylindrical housing 308. Heater system 318 is associated with cylindrical housing 308. As depicted, heater system 318 is incorporated into cylindrical housing 308.

As depicted, piston 306 seals cylindrical housing 308. Piston 306 contacts and has an airtight seal with cylindrical housing 308. Bulk molding compound 320 within compression chamber 312 is degassed using vacuum port 316. Plug 321 seals cylindrical housing 308 for the degassing. Plug 321 blocks an opening (not depicted) of extrusion die 304.

As depicted, extrusion die 304 has taper 323. Due to taper 323, an opening (not depicted) of extrusion die 304 has a smaller cross-section than a cross-section of cylindrical housing 308. The smaller cross-section of the opening (not depicted) of extrusion die 304 helps sustain a higher pressure during extrusion. The smaller cross-section of the opening (not depicted) of extrusion die 304 helps to maintain a low porosity in the extruded ingot (not depicted).

In view 322, piston 306 is at initial location 324. From initial location 324, piston 306 is driven by actuator 326 in direction 328 towards extrusion die 304. As piston 306 moves in direction 328, piston 306 will compress bulk molding compound 320 as shown in FIG. 4.

When piston 306 passes vacuum port 316, the vacuum may be released from vacuum port 316. When piston 306 passes vacuum port 316, the airtight seal between piston 306 and cylindrical housing 308 maintains the vacuum within bulk molding compound 320.

In some illustrative examples, bulk molding compound 320 has been preheated before being placed into cylindrical housing 308. In these illustrative examples, bulk molding compound 320 may be referred to as "heated bulk molding compound."

Figure 4:
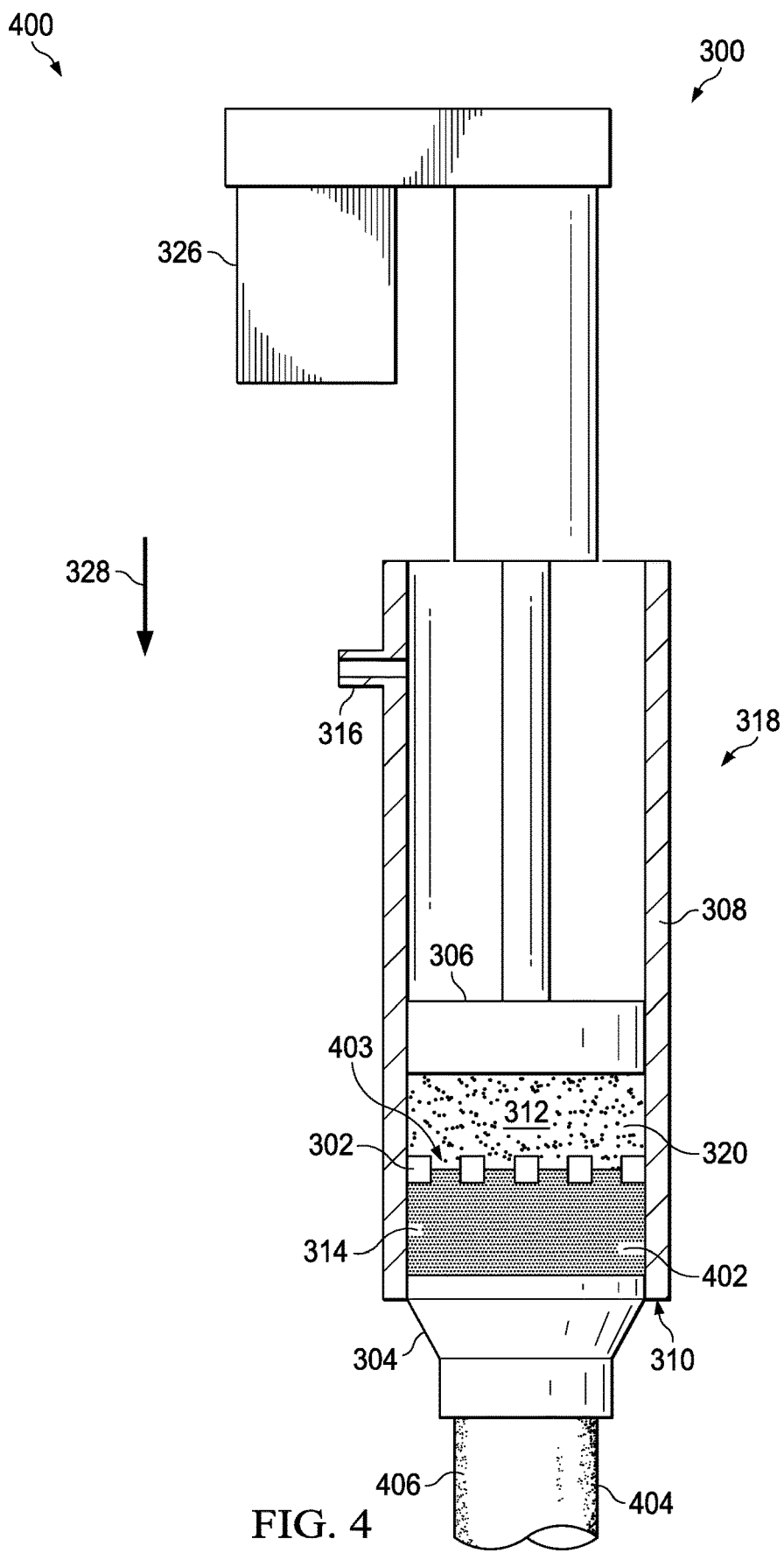
FIG. 4 is an illustration of a cross-sectional view of a consolidation system in which a bulk molding compound is consolidated in accordance with an illustrative embodiment.

Turning now to FIG. 4, an illustration of a cross-sectional view of a consolidation system in which a bulk molding compound is consolidated is depicted in accordance with an illustrative embodiment. In view 400, piston 306 moves in direction 328, pressing bulk molding compound 320 through die breaker 302. Bulk molding compound 320 is pressed through die breaker 302 to form pressed material 402.

As bulk molding compound 320 is pressed through die breaker 302, greater pressure is applied to bulk molding compound 320 due to the size of plurality of holes 403 of die breaker 302. The greater pressure applied to bulk molding compound 320 consolidates bulk molding compound 320.

As bulk molding compound 320 is pressed through die breaker 302, at least a portion of the fibers within bulk molding compound 320 are axially aligned. Aligning the fibers within the bulk molding compound 320 may be desirable for some composite structures to be created from consolidated material 404. As depicted, bulk molding compound 320 is pressed through plurality of holes 403 of die breaker 302 to form pressed material 402.

Pressed material 402 within relaxation chamber 314 has been pressed through die breaker 302. Pressed material 402 is remixed and relaxed within relaxation chamber 314.

Relaxation chamber 314 is used to stabilize material form. Relaxation gives the pressed material 402 time to remix and expand prior to extrusion through extrusion die 304. Relaxation reduces expansion after extrusion through extrusion die 304. In some illustrative examples, relaxation reduces the porosity of consolidated material 404.

In some illustrative examples, relaxation chamber 314 may also be referred to as an "extrusion zone." In relaxation chamber 314, pressed material 402 is remixed after die breaker 302 and relaxes before being extruded through extrusion die 304. Remixing pressed material 402 aids in equal wetting of the fillers of pressed material 402 with the resin in pressed material 402. By relaxing, pressed material 402 does not retain the shape of plurality of holes 403 or a plurality of slots of die breaker 302.

Die breaker 302 provides for back pressure enhancement for extrusion die 304. When die breaker 302 is present, consolidated material 404 expands less after extrusion than when die breaker 302 is not present. When die breaker 302 is present, die breaker 302 increases homogenization of consolidated material 404.

As piston 306 moves in direction 328, pressed material 402 is extruded through extrusion die 304 of consolidation system 300. Consolidated material 404 is extruded from extrusion die 304. Consolidated material 404 takes the form of slug 406. Slug 406 has a lower porosity (not depicted) than a porosity (not depicted) of bulk molding compound 320 loaded into cylindrical housing 308 in FIG. 3. Slug 406 has a lower porosity than bulk molding compound 320 due to the heating, degassing, and compression applied by consolidation system 300. Slug 406 has a lower porosity than bulk molding compound 320 due to the consolidation through die breaker 302. Slug 406 also has better wetting of fillers within slug 406 by the resin in slug 406 than bulk molding compound 320 due to the compression applied by consolidation system 300.

After exiting consolidation system 300, consolidated material 404 is ready to be formed in a separate manufacturing process. In some illustrative examples, consolidated material 404 is used in a molding application. Forming a component (not depicted) by molding consolidated material 404 creates a component with a higher quality than a component formed by molding bulk molding compound 320 directly. The reduced porosity of molding consolidated material 404 results in a component with a higher quality than a component formed by molding bulk molding compound 320 directly.

In some illustrative examples, consolidated material 404 in slug 406 is not subjected to an additional molding process to form a composite structure. In some illustrative examples, slug 406 is used with the extruded cross-section. For example, slug 406 may be laid down as a composite radius filler in some illustrative examples.

In some illustrative examples, consolidation system 300 is part of an end effector to apply slug 406 to a composite material or tooling. In some illustrative examples, consolidation system 300 is part of a composite radius filler extruding end effector in which slug 406 is used as a composite radius filler.

Slug 406 may have any desirable shape. In some illustrative examples, a shape of slug 406 is selected based on a composite structure to be formed. In some illustrative examples, slug 406 may instead be one or more thin sheets. The thin sheets may be formed into a bracket, a panel, or any other desirable composite structure.

Figure 5:
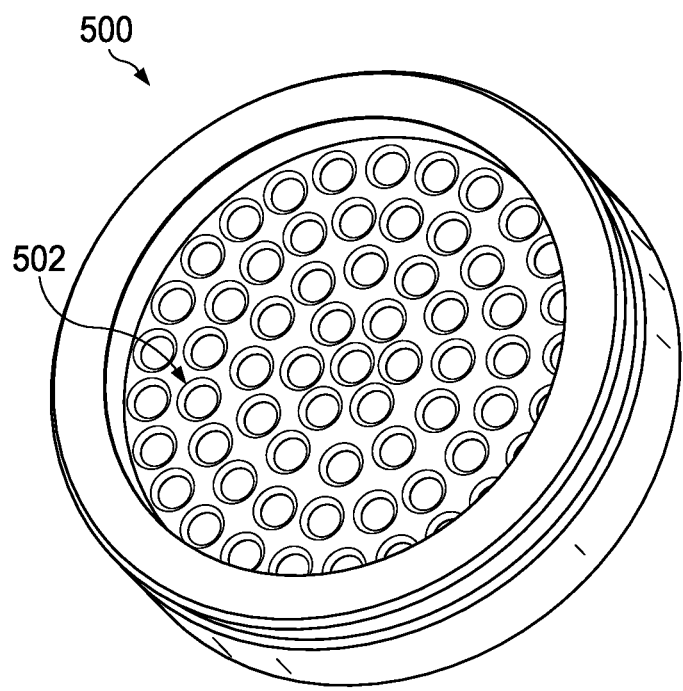
FIG. 5 is an illustration of an isometric view of a die breaker of a consolidation system in accordance with an illustrative embodiment.

Turning now to FIG. 5, an illustration of an isometric view of a die breaker of a consolidation system is depicted in accordance with an illustrative embodiment. Die breaker 500 is a physical implementation of die breaker 120 of FIG. 1. Die breaker 500 may be used in consolidation system 102 of FIG. 1. Die breaker 500 may be the same as die breaker 302 of FIGS. 3 and 4.

Die breaker 500 comprises at least one of a plurality of holes or a plurality of slots. As depicted, die breaker 500 has plurality of holes 502. In other non-depicted illustrative examples, die breaker 500 has one or more slots in addition to a plurality of holes. In other non-depicted illustrative examples, die breaker 500 has a plurality of slots without plurality of holes 502.

As a bulk molding compound is pressed through die breaker 500, greater pressure is applied to the bulk molding compound due to the size of plurality of holes 502 of die breaker 500. As depicted, the diameter of each of plurality of holes 502 is 0.25". As depicted, a thickness of die breaker 500 is about 0.5". The thickness of die breaker 500 is selected to have a bulk molding compound pass through die breaker 500 for a sufficient period of time to consolidate the bulk molding compound. The greater pressure applied to the bulk molding compound consolidates the bulk molding compound.

As a bulk molding compound is pressed through die breaker 500, at least a portion of the fibers within the bulk molding compound are axially aligned. Aligning the fibers within the bulk molding compound may be desirable for some composite structures to be created from a consolidated material formed using a consolidation system comprising die breaker 500.

Figure 6:
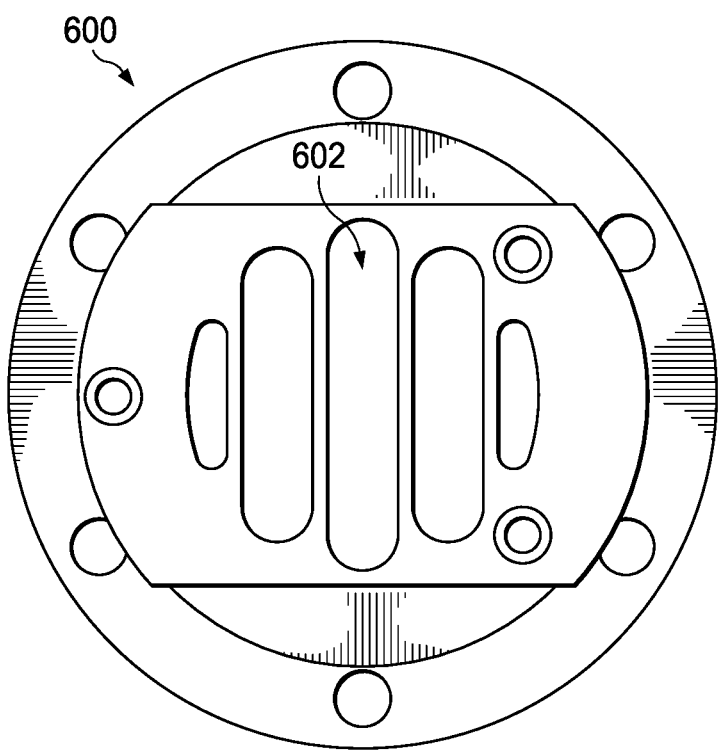
FIG. 6 is an illustration of a front view of a die breaker of a consolidation system in accordance with an illustrative embodiment.

Turning now to FIG. 6, an illustration of a front view of a die breaker of a consolidation system is depicted in accordance with an illustrative embodiment. Die breaker 600 is a physical implementation of die breaker 120 of FIG. 1. Die breaker 600 may be used in consolidation system 102 of FIG. 1. Die breaker 600 may be the same as die breaker 302 of FIGS. 3 and 4.

Die breaker 600 comprises at least one of a plurality of holes or a plurality of slots. As depicted, die breaker 600 has plurality of slots 602. In other non-depicted illustrative examples, die breaker 600 has one or more holes in addition to plurality of slots 602. In other non-depicted illustrative examples, die breaker 600 has a plurality of holes without plurality of slots 602.

As a bulk molding compound is pressed through die breaker 600, greater pressure is applied to the bulk molding compound due to the size of plurality of slots 602 of die breaker 600. As depicted, the length of plurality of slots 602 is not identical. In some illustrative examples, the length of each of plurality of slots 602 is in the range of 0.25" to 0.5". The greater pressure applied to the bulk molding compound consolidates the bulk molding compound.

As a bulk molding compound is pressed through die breaker 600, at least a portion of the fibers within the bulk molding compound are axially aligned. Aligning the fibers within the bulk molding compound may be desirable for some composite structures to be created from a consolidated material formed using a consolidation system comprising die breaker 600.

The different components shown in FIGS. 2-6 may be combined with components in FIG. 1, used with components in FIG. 1, or a combination of the two. Additionally, some of the components in FIGS. 2-6 may be illustrative examples of how components shown in block form in FIG. 1 may be implemented as physical structures.

Figure 7:
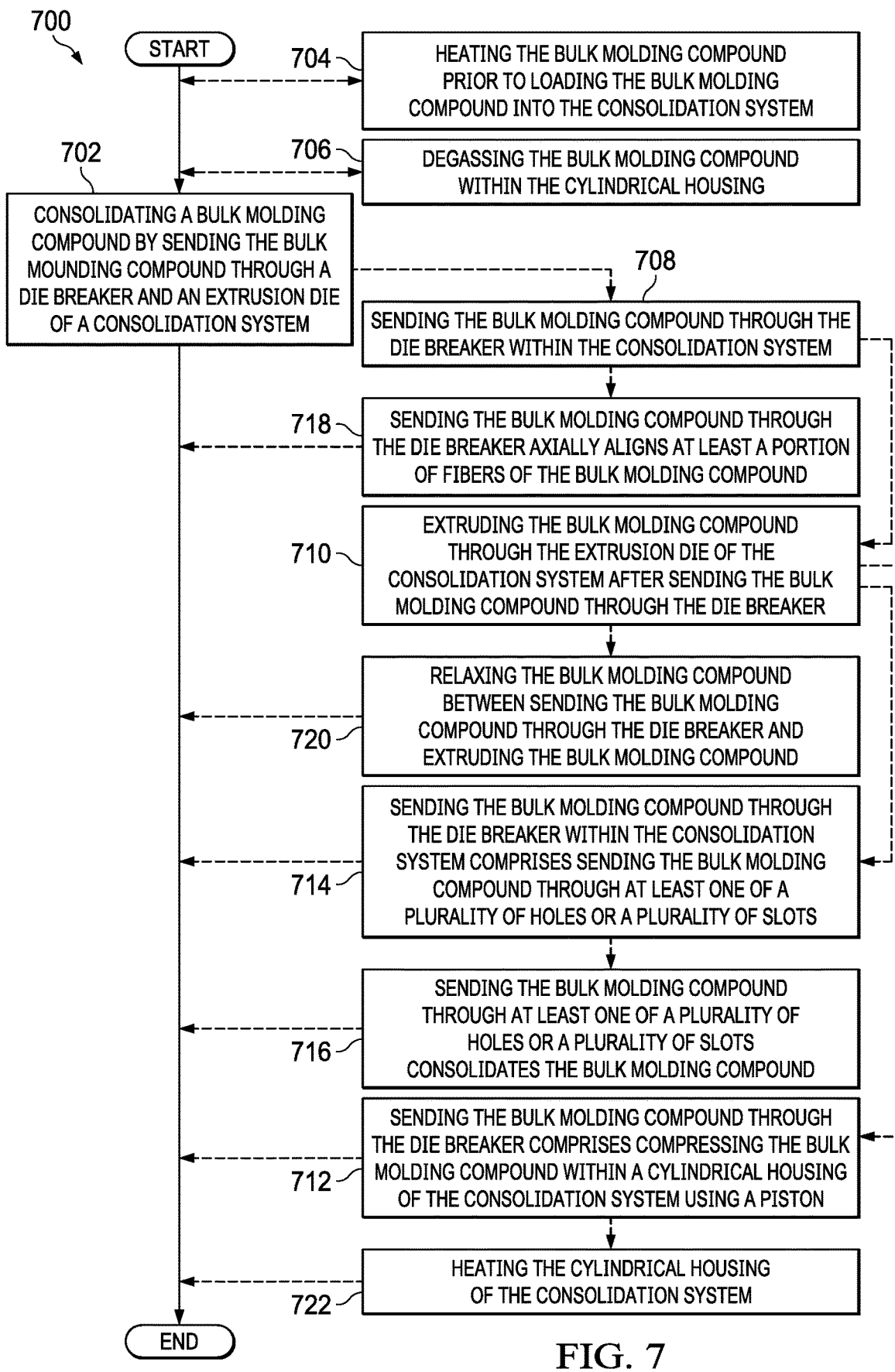
FIG. 7 is an illustration of a flowchart of a method for consolidating a bulk molding compound in accordance with an illustrative example.

Turning now to FIG. 7, an illustration of a flowchart of a method for consolidating a bulk molding compound is depicted in accordance with an illustrative embodiment. Method 700 may be used to consolidate bulk molding compound 104 using consolidation system 102 of FIG. 1. Method 700 may be implemented in manufacturing environment 200 using consolidation system 202 of FIG. 2. Method 700 may be performed using consolidation system 300 of FIGS. 3 and 4. Die breaker 500 of FIG. 5 may be used to perform method 700.

Method 700 consolidates a bulk molding compound by sending the bulk molding compound through a die breaker and an extrusion die of a consolidation system (operation 702). Afterwards, method 700 terminates.

In some illustrative examples, method 700 heats the bulk molding compound prior to loading the bulk molding compound into the consolidation system (operation 704). By pre-heating the bulk molding compound prior to loading into the consolidation system, the initiation of pressure by the piston may be started earlier than by heating the bulk molding compound entirely by a heating system associated with the cylindrical housing.

In some illustrative examples, method 700 degases the bulk molding compound within the cylindrical housing (operation 706). Degassing the bulk molding compound removes gases from the bulk molding compound to increase the density of the consolidated material. In some illustrative examples, method 700 degases the bulk molding compound by applying a vacuum to the bulk molding compound. In some illustrative examples, the vacuum is applied until the piston passes by the vacuum port.

In some illustrative examples, consolidating the bulk molding compound comprises sending the bulk molding compound through the die breaker within the consolidation system (operation 708); and extruding the bulk molding compound through the extrusion die of the consolidation system after sending the bulk molding compound through the die breaker (operation 710). In some illustrative examples, sending the bulk molding compound through the die breaker comprises compressing the bulk molding compound within a cylindrical housing of the consolidation system using a piston (operation 712). The piston may also be referred to as a "compression piston." The piston may be driven by an actuator or any other desirable driving mechanism.

In some illustrative examples, sending the bulk molding compound through the die breaker within the consolidation system comprises sending the bulk molding compound through at least one of a plurality of holes or a plurality of slots (operation 714). The at least one of the plurality of holes or the plurality of slots may have any desirable layout, any desirable size, and any desirable quantity. In some illustrative examples, sending the bulk molding compound through at least one of a plurality of holes or a plurality of slots consolidates the bulk molding compound (operation 716).

In some illustrative examples, sending the bulk molding compound through the die breaker axially aligns at least a portion of fibers in the bulk molding compound (operation 718). As the bulk molding compound is pressed through the die breaker, greater pressure is applied to the bulk molding compound due to the size of a plurality of holes or a plurality of slots of die breaker. The greater pressure applied to the bulk molding compound consolidates bulk molding compound. In some illustrative examples, method 700 relaxes the bulk molding compound between sending the bulk molding compound through the die breaker and extruding the bulk molding compound (operation 720).

In some illustrative examples, method 700 heats the cylindrical housing of the consolidation system (operation 722). By heating the cylindrical housing, the bulk molding compound within the cylindrical housing is heated. Heating the bulk molding compound reduces the viscosity of the bulk molding compound.

The cylindrical housing is heated using any desirable heating process. The heater system may be associated with the cylindrical housing by being directed at, contacting, being connected to, or being formed within the cylindrical housing.

Figure 8:
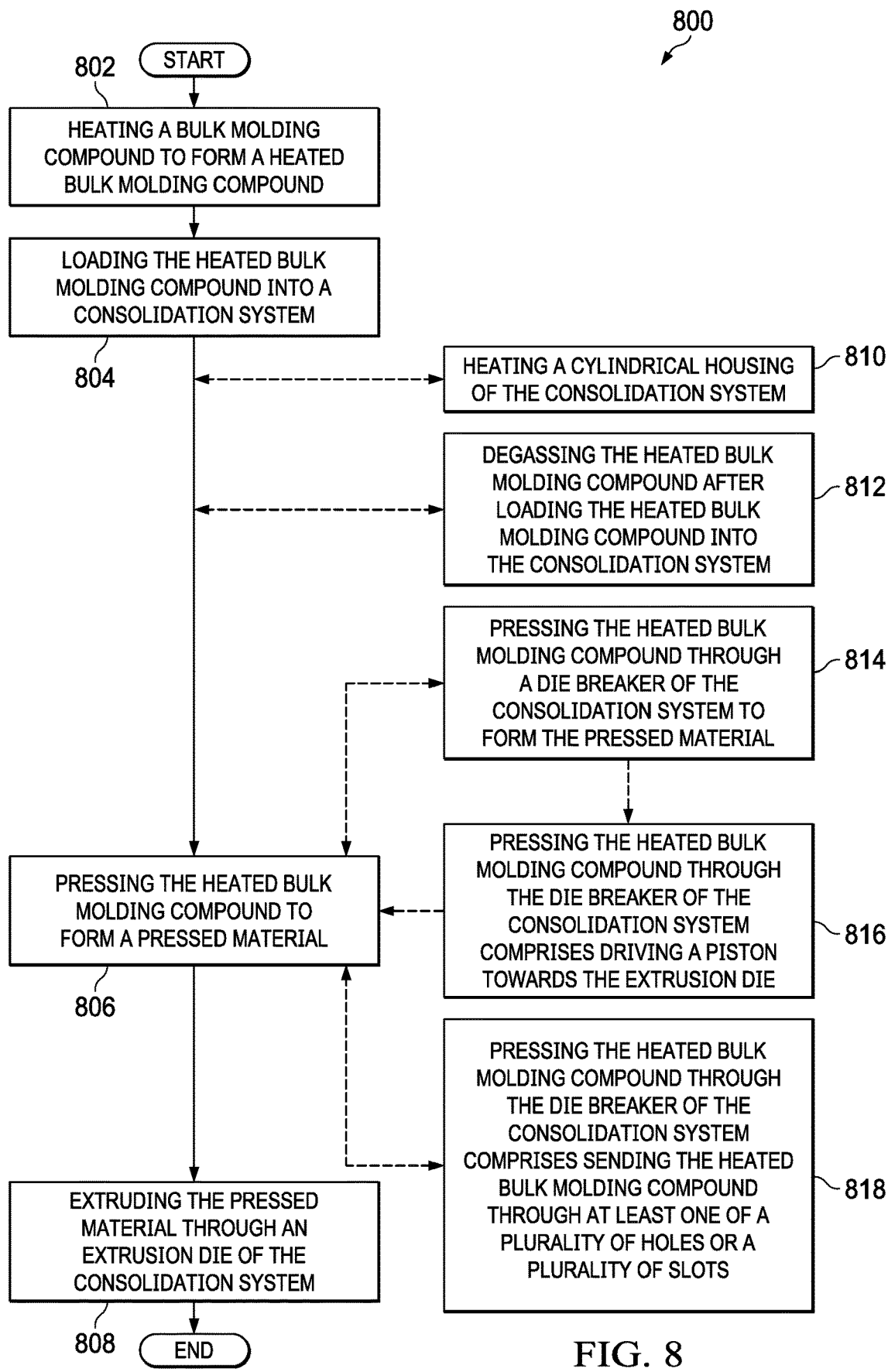
FIG. 8 is an illustration of a flowchart of a method for consolidating a bulk molding compound in accordance with an illustrative example.

Turning now to FIG. 8, an illustration of a flowchart of a method for consolidating a bulk molding compound is depicted in accordance with an illustrative example. Method 800 may be used to consolidate bulk molding compound 104 using consolidation system 102 of FIG. 1. Method 800 may be implemented in manufacturing environment 200 using consolidation system 202 of FIG. 2. Method 800 may be performed using consolidation system 300 of FIGS. 3 and 4. Die breaker 500 of FIG. 5 may be used to perform method 800.

Method 800 heats a bulk molding compound to form a heated bulk molding compound (operation 802). Method 800 loads the heated bulk molding compound into a consolidation system (operation 804). Method 800 presses the heated bulk molding compound to form a pressed material (operation 806). Method 800 extrudes the pressed material through an extrusion die of the consolidation system (operation 808). Afterwards, method 800 terminates.

In some illustrative examples, method 800 heats a cylindrical housing of the consolidation system (operation 810). The cylindrical housing may be heated in any desirable fashion and by any desirable heater system. The heater system may be associated with the cylindrical housing by being directed at, contacting, being connected to, or being formed within the cylindrical housing.

In some illustrative examples, method 800 degases the heated bulk molding compound after loading the heated bulk molding compound into the consolidation system (operation 812). The heated bulk molding compound is degassed by applying a vacuum to the heated bulk molding compound within the consolidation system. Prior to degassing the heated bulk molding compound, the consolidation system is sealed.

In some illustrative examples, pressing the heated bulk molding compound of the consolidation system to form the pressed material comprises pressing the heated bulk molding compound through a die breaker of the consolidation system (operation 814). In some illustrative examples, pressing the heated bulk molding compound through the die breaker of the consolidation system comprises driving a piston towards the extrusion die (operation 816).

In some illustrative examples, pressing the heated bulk molding compound through the die breaker of the consolidation system comprises sending the heated bulk molding compound through at least one of a plurality holes or a plurality of slots (operation 818). The at least one of the plurality of holes or the plurality of slots of the die breaker may have any desirable layout, any desirable size, and any desirable quantity.

As the heated bulk molding compound is pressed through the die breaker, at least a portion of the fibers within the heated bulk molding compound are axially aligned. For some composite structures, axially aligned fibers desirably strengthen the composite structure. Having axially aligned fibers will make a composite structure stronger in tension. In some illustrative examples, the consolidated material extruded from the consolidation system forms a composite radius filler. Having axially aligned fibers will desirably make a composite radius filler stronger in tension.

As the heated bulk molding compound is pressed through the die breaker, greater pressure is applied to the heated bulk molding compound due to the size of a plurality of holes or a plurality of slots of die breaker. The greater pressure applied to the heated bulk molding compound consolidates bulk molding compound.

Figure 9:
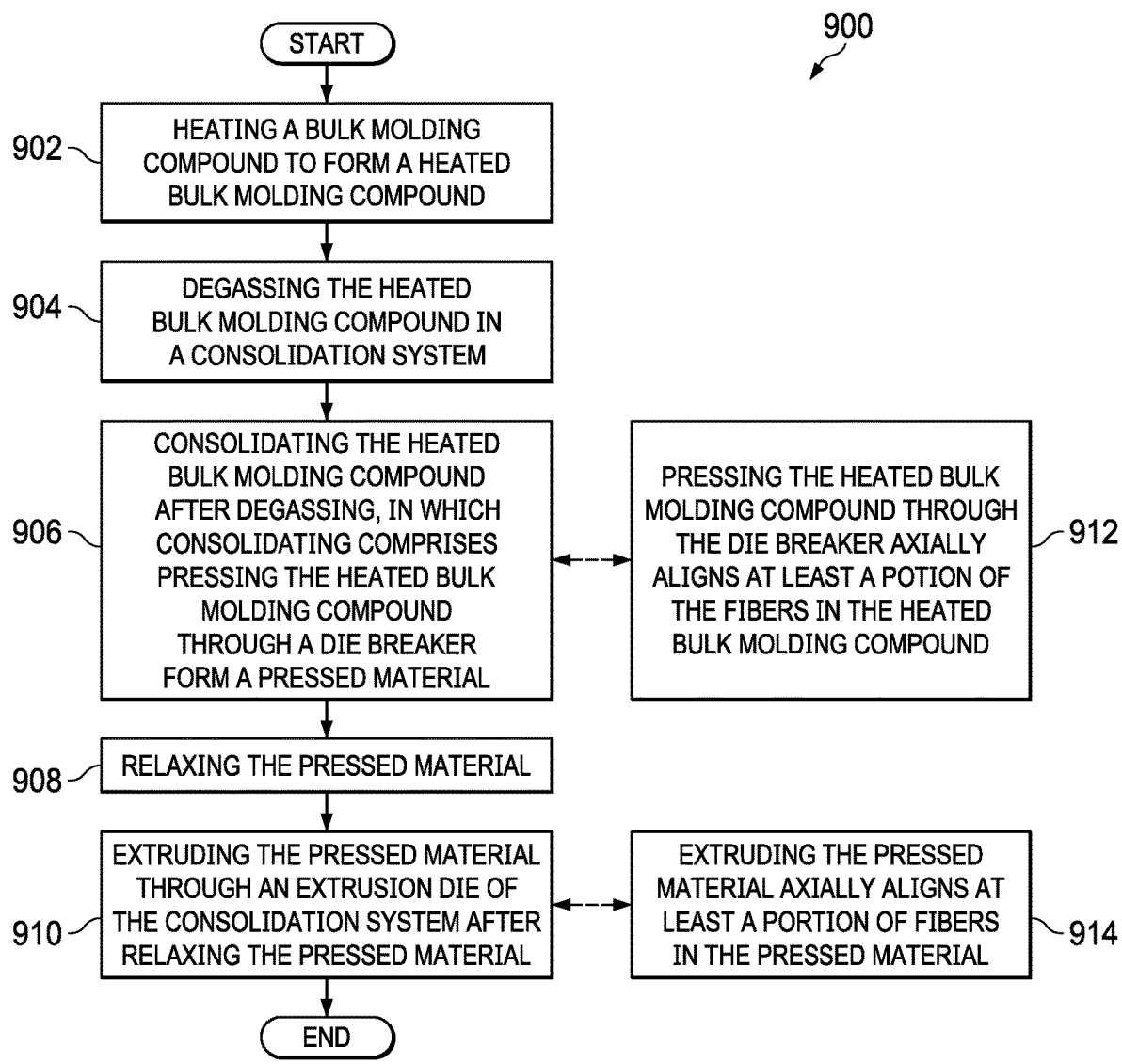
FIG. 9 is an illustration of a flowchart of a method for consolidating a bulk molding compound in accordance with an illustrative example.

Turning now to FIG. 9, an illustration of a flowchart of a method for consolidating a bulk molding compound is depicted in accordance with an illustrative example. Method 900 may be used to consolidate bulk molding compound 104 using consolidation system 102 of FIG. 1. Method 900 may be implemented in manufacturing environment 200 using consolidation system 202 of FIG. 2. Method 900 may be performed using consolidation system 300 of FIGS. 3 and 4. Die breaker 500 of FIG. 5 may be used to perform method 900.

Method 900 heats a bulk molding compound to form a heated bulk molding compound (operation 902). Method 900 degases the heated bulk molding compound in a consolidation system (operation 904). Method 900 consolidates the heated bulk molding compound after degassing, in which consolidating comprises pressing the heated bulk molding compound through a die breaker form a pressed material (operation 906). Method 900 relaxes the pressed material (operation 908). Method 900 extrudes the pressed material through an extrusion die of the consolidation system after relaxing the pressed material (operation 910). Afterwards, method 900 terminates.

In some illustrative examples, pressing the heated bulk molding compound through the die breaker axially aligns at least a portion of fibers in the heated bulk molding compound (operation 912). In some illustrative examples, extruding the pressed material axially aligns at least a portion of fibers in the pressed material (operation 914). In some illustrative examples, extruding the pressed material forms a composite radius filler.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 700, method 800, or method 900 are performed. For example, some of operations 704 through 716 may be optional. In some illustrative examples, some of operations 810 through 818 may be optional. In some illustrative examples, operations 912 through 914 may be optional.

Figure 10:
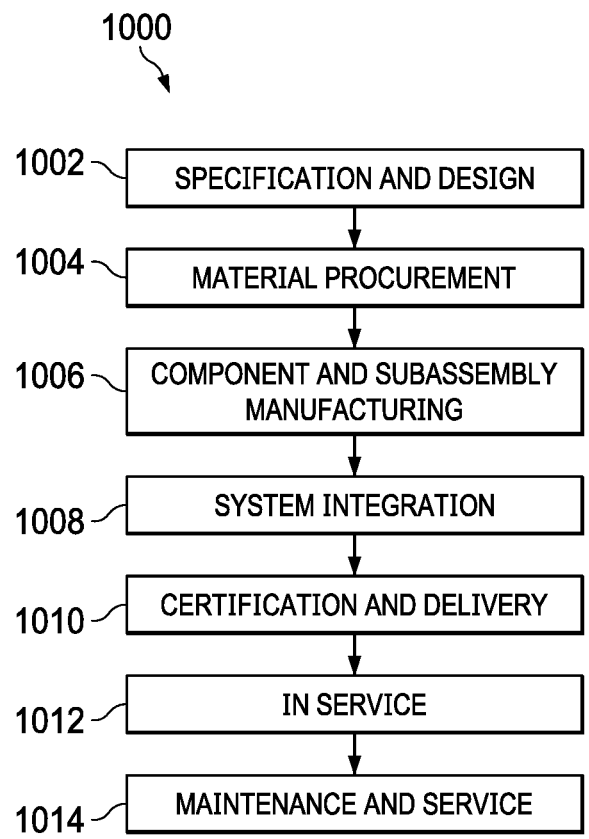
FIG. 10 is an illustration of an aircraft manufacturing and service method in the form of a block diagram in accordance with an illustrative example.
Figure 11:
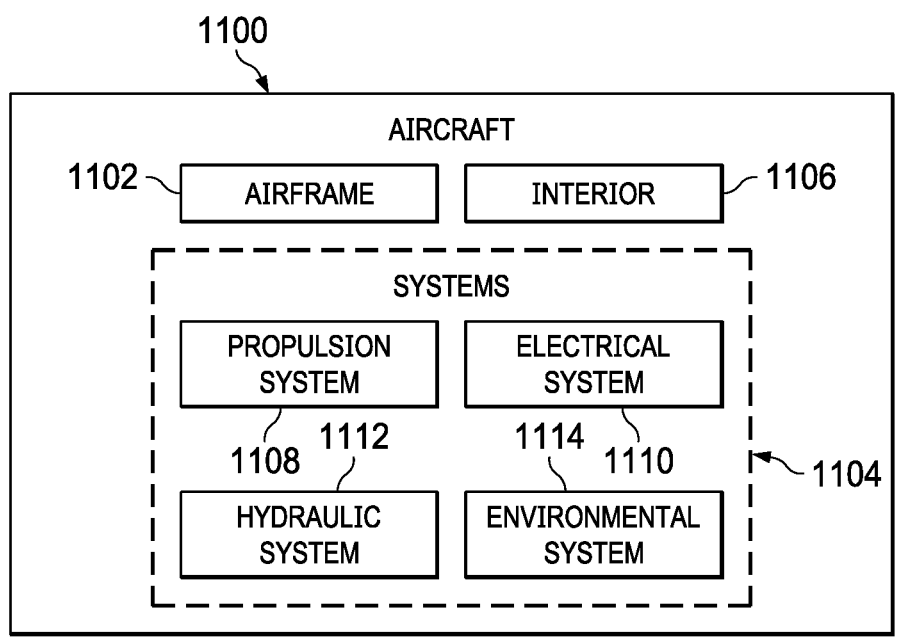
FIG. 11 is an illustration of an aircraft in the form of a block diagram in which an illustrative example may be implemented.

The illustrative examples of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative example. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 11, an illustration of an aircraft is depicted in which an illustrative example may be implemented. In this example, aircraft 1100 is produced by aircraft manufacturing and service method 1000 in FIG. 10 and may include airframe 1102 with a plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1000. One or more illustrative examples may be used during component and subassembly manufacturing 1006, system integration 1008, or maintenance and service 1014 of FIG. 10. For example, consolidated material 116 of FIG. 1 consolidated by consolidation system 102 of FIG. 1 may be used to form a component of aircraft 1100 during component and subassembly manufacturing 1006. As another example, consolidated material 116 consolidated by consolidation system 102 may be used to form a replacement part during maintenance and service 1014 of FIG. 10.

Apparatuses and methods embodied herein may be employed in manufacturing at least one component of aircraft 1100. For example, consolidation system 102 of FIG. 1 creates consolidated material 116 of FIG. 1 that may be molded into a component for one of airframe 1102 or interior 1106.

The illustrative examples provide methods and an apparatus for consolidating a bulk molding compound. The consolidated material formed by consolidating a bulk molding compound can be used to make high quality composite products. Molding a consolidated material produces at least one of reduced porosity or reduced inconsistencies in the molded composite parts. Molding a consolidated material produces a higher quality composite part than molding a bulk molding compound. Molding a consolidated material of the illustrative examples produces a composite part with better structural performance.

Handling a consolidated material of the illustrative examples is easier than handling a bulk molding compound. The bulk molding compound is a loose material and may generate undesirable amounts of fine dust. The consolidated material has a lower porosity and is in the form of a slug or ingot. Handling a consolidated material of the illustrative examples produces less fine dust than handling a bulk molding compound.

At least a portion of the fibers in the bulk molding compound are axially aligned during the consolidation process. In some illustrative examples, axially aligned fibers desirably strengthen the composite structure. For example, having axially aligned fibers will make a composite structure stronger in tension. In some illustrative examples, the consolidated material extruded from the consolidation system forms a composite radius filler. Having axially aligned fibers will desirably make a composite radius filler stronger in tension.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
consolidating a bulk molding compound by:
loading the bulk molding compound into a compression chamber of a consolidation system, the compression chamber formed between a piston and a die breaker, the piston sealing a first end of the consolidation system, the die breaker separating the compression chamber from a relaxation chamber of the consolidation system, the relaxation chamber formed between the die breaker and an extrusion die connected to a second end of the consolidation system opposite the first end, wherein a plug seals the second end blocking an opening of the extrusion die;
degassing the bulk molding compound by applying a vacuum to the bulk molding compound within the consolidation system and evacuating gases from the compression chamber and the relaxation chamber; and sending the bulk molding compound through the die breaker and the extrusion die of the consolidation system, the bulk molding compound forcing the plug out of the opening of the extrusion die and maintaining the vacuum within the consolidation system.

2. The method of claim 1, wherein consolidating the bulk molding compound comprises:
sending the bulk molding compound through the die breaker within the consolidation system; and
extruding the bulk molding compound through the extrusion die of the consolidation system after sending the bulk molding compound through the die breaker.

3. The method of claim 2, wherein sending the bulk molding compound through the die breaker axially aligns at least a portion of fibers in the bulk molding compound.

4. The method of claim 2, further comprising:
relaxing the bulk molding compound between sending the bulk molding compound through the die breaker and extruding the bulk molding compound.

5. The method of claim 2, wherein sending the bulk molding compound through the die breaker comprises compressing the bulk molding compound within a cylindrical housing of the consolidation system using the piston.

6. The method of claim 5, further comprising:
degassing the bulk molding compound through a vacuum port within the cylindrical housing.

7. The method of claim 5, further comprising:
heating the cylindrical housing of the consolidation system.

8. The method of claim 2, wherein sending the bulk molding compound through the die breaker within the consolidation system comprises sending the bulk molding compound through at least one of a plurality of holes or a plurality of slots of the die breaker.

9. The method of claim 8, wherein sending the bulk molding compound through at least one of the plurality of holes or the plurality of slots consolidates the bulk molding compound.

10. The method of claim 1, further comprising:
heating the bulk molding compound prior to loading the bulk molding compound into the consolidation system.

11. The method of claim 1, wherein the bulk molding compound is a loose composite material formed of a resin and fillers.

12. The method of claim 1, wherein consolidating the bulk molding compound forms a consolidated material, the method further comprising:
forming a composite structure from the consolidated material, wherein the composite structure is a component of an aircraft.

13. The method of claim 12, wherein the composite structure is a composite radius filler.

14. A method comprising:
heating a bulk molding compound to form a heated bulk molding compound;
loading the heated bulk molding compound into a compression chamber of a consolidation system, the compression chamber formed between a piston and a die breaker, the piston sealing a first end of the consolidation system and the die breaker separating the compression chamber from a relaxation chamber of the consolidation system, the relaxation chamber formed between the die breaker and an extrusion die connected to a second end of the consolidation system opposite the first end, wherein a plug seals the second end blocking an opening of the extrusion die;
degassing the heated bulk molding compound by applying a vacuum to the heated bulk molding compound within the consolidation system and evacuating gases from the compression chamber and the relaxation chamber;
pressing the heated bulk molding compound with the piston through the die breaker and into the relaxation chamber to form a pressed material; and
extruding the pressed material through an extrusion die of the consolidation system, the pressed material forcing the plug out of the opening of the extrusion die and maintaining the vacuum within the consolidation system.

15. The method of claim 14, further comprising:
heating a cylindrical housing of the consolidation system.

16. The method of claim 14, further comprising:
degassing the heated bulk molding compound after loading the heated bulk molding compound into the consolidation system.

17. The method of claim 14, wherein pressing the heated bulk molding compound of the consolidation system to form the pressed material comprises pressing the heated bulk molding compound through the die breaker of the consolidation system, and wherein pressing the heated bulk molding compound through the die breaker of the consolidation system comprises driving the piston towards the extrusion die.

18. The method of claim 17, wherein pressing the heated bulk molding compound through the die breaker of the consolidation system comprises sending the heated bulk molding compound through at least one of a plurality of holes or a plurality of slots.

19. The method of claim 14, wherein the bulk molding compound is a loose composite material formed of a resin and fillers.

20. The method of claim 14, wherein extruding the pressed material through the extrusion die of the consolidation system forms a consolidated material, the method further comprising:
forming a composite structure from the consolidated material, wherein the composite structure is a component of an aircraft.

21. A method comprising:
heating a bulk molding compound to form a heated bulk molding compound;
loading the heated bulk molding compound into a compression chamber of a consolidation system, the compression chamber formed between a piston and a die breaker, the piston sealing a first end of the consolidation system and the die breaker separating the compression chamber from a relaxation chamber of the consolidation system, the relaxation chamber formed between the die breaker and an extrusion die connected to a second end of the consolidation system opposite the first end, wherein a plug seals the second end blocking an opening of the extrusion die;
degassing the heated bulk molding compound by applying a vacuum to the heated bulk molding compound within the consolidation system and evacuating gases from the compression chamber and the relaxation chamber;
consolidating the heated bulk molding compound after degassing, in which consolidating comprises pressing the heated bulk molding compound through the die breaker to form a pressed material by driving the piston towards the extrusion die;

relaxing the pressed material in the relaxation chamber; and extruding the pressed material through an extrusion die of the consolidation system after relaxing the pressed material, the pressed material forcing the plug out of the opening of the extrusion die and maintaining the vacuum within the consolidation system.

22. The method of claim 21, wherein pressing the heated bulk molding compound through the die breaker axially aligns at least a portion of fibers in the heated bulk molding compound.

23. The method of claim 21, wherein extruding the pressed material axially aligns at least a portion of fibers in the pressed material.

24. The method of claim 21, wherein extruding the pressed material forms a composite radius filler.

* * * * *